Oct. 17, 1933.  D. F. SEARLE  1,930,827
AIR CONTROL MECHANISM
Filed July 29, 1932
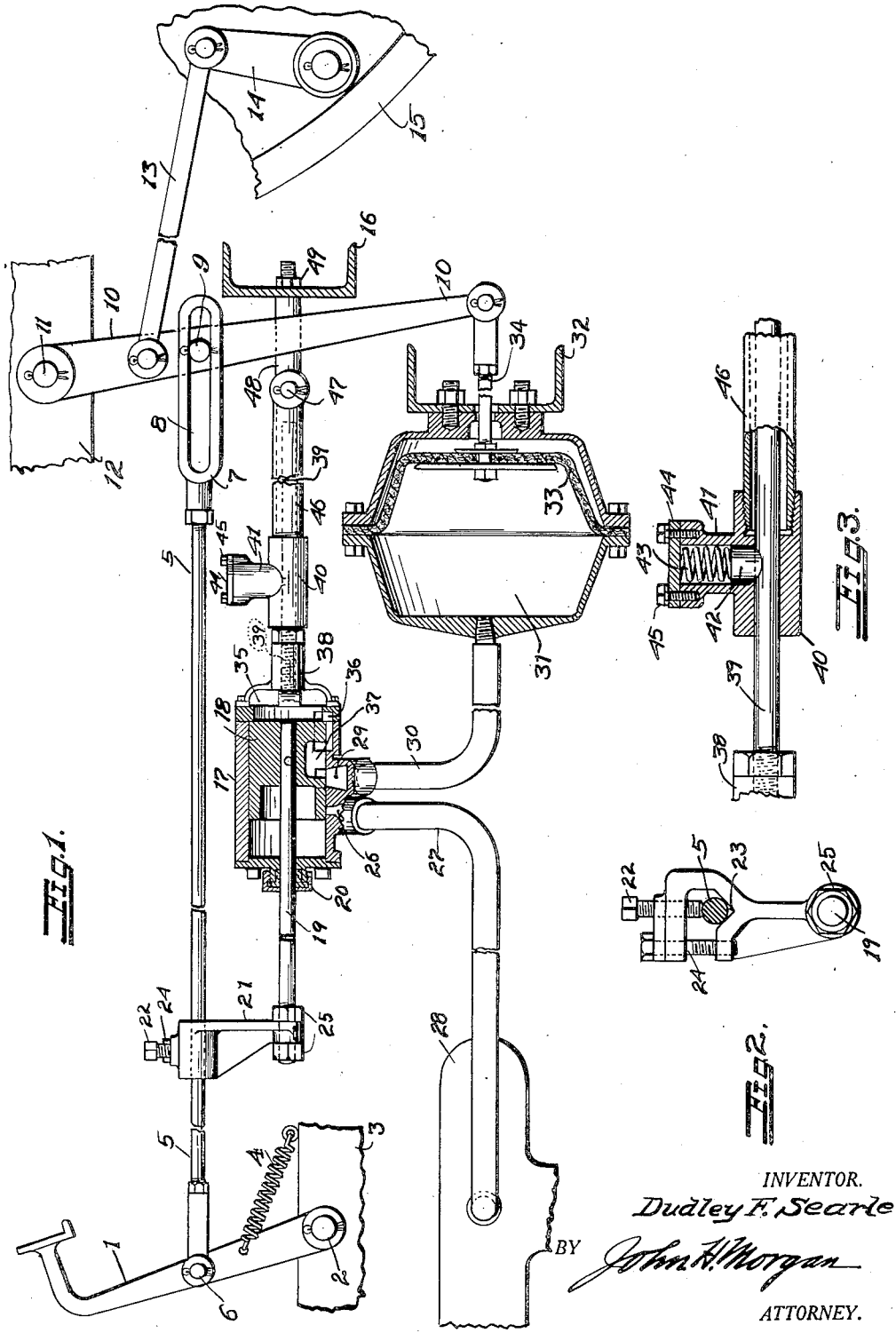
INVENTOR.
Dudley F. Searle
BY John H. Morgan
ATTORNEY.

Patented Oct. 17, 1933

1,930,827

UNITED STATES PATENT OFFICE 1,930,827

AIR CONTROL MECHANISM

Dudley F. Searle, Oakland, Calif.

Application July 29, 1932. Serial No. 625,819

6 Claims. (Cl. 188—152)

My invention relates to improvements in air control mechanism of the class adapted to control the operation of various machines or parts of certain machines that function by suction power, and more particularly this invention relates to air control mechanism for vehicle brakes operated by suction from the intake manifold of the motor, and is an improvement on my motor-vehicle-airbrake application filed Nov. 30, 1931, Ser. No. 577,936.

The principal object of my invention is to provide a simple mechanism which can be easily attached to the present foot-pedal brake system of motor vehicles so that the first movement of the foot pedal connects the suction means to apply the brakes.

Another object is to provide means for supporting a control valve body so that the valve operating means can be attached to the brake operating means to be moved therewith, and means to retard the movement of the valve body so that the valve will operate at the first movement of the foot pedal.

Another object is to provide a control unit which may be applied without cutting the brake rod, or other rods in making the attachment to the brake systems of motor vehicles in use.

A further object of the invention is to provide an air control mechanism that can be applied to other uses as well as to motor vehicle brakes.

Other objects will appear to those skilled in the art as the description progresses.

An embodiment of the invention is shown in the accompanying drawing in which the same reference numeral is applied to the same portion throughout the several views and of which there may be modifications.

Figure 1 is a partly sectional and partly diagrammatic view showing the complete application of the invention to motor vehicle brakes, Figure 2 is a front view of the bracket for attaching the valve operating rod to the brake rod, and Figure 3 is a sectional view of the retarding sleeve on the valve body rod.

The numeral 1 indicates a brake pedal of a motor vehicle pivoted at 2 on a portion of the frame 3. A spring 4 acts to hold the pedal in the position shown. Attached to the pedal is the brake rod 5 by means of the pivot pin 6. On the other end of the rod is the slip clevis 7 having the slot 8 which engages the pin 9 in the brake lever 10 pivoted on the pin 11 in a portion of the frame 12. In practice the lever 10 would be fixed on the pin or rod 11 to operate the brake drum on the opposite side of the vehicle, but for simplicity of illustration a single brake unit is shown.

A rod 13 connects the brake lever to the usual lever 14 on the brake drum 15.

Connected to a cross member 16 of the frame is the control unit which comprises a control valve body 17, a slidable valve 18 therein, a slidable rod 19 fixed on the valve and extending out of the valve body through the stuffing box 20.

A bracket 21 adapted to connect the valve operating rod to the brake rod is shown in this instance, but this operating rod may extend forward to the foot pedal and be pivoted thereto, or other means may be had for operating this rod. A set screw 22 clamps the rod in the V shaped jaw 23, and to prevent the springing of the jaws a clamp screw 24 is provided. The end of the rod 19 being threaded, the nuts 25 securely hold the bracket in place.

Any suitable valve and valve body may be used in my control unit, but in this instance a cylindrical valve body, and a pistonlike valve is illustrated, the valve body having a port 26 connected by a flexible conduit 27 to the manifold intake 28 of the vehicle motor, and a port 29 connected by a flexible conduit 30 to a vacuum chamber 31 which is attached to a cross member 32 of the frame of the vehicle.

The vacuum chamber is of the usual design having a flexible diaphragm 33 to which is fixed a rod 34 pivotally connected to the brake lever 10.

The valve body 17 has the open end 35 with which the exhaust port 36 communicates. The valve has the port 37 which is adapted to connect the ports 26 and 29 or the ports 29 and 36. The open end of the valve body has the head 38 secured thereto by the spider arms on the sleeve in which is fixed the support rod 39 adapted to slide in the retarding sleeve 40. The sleeve has the hollow projecting member 41 which carries the block 42 pressing on the rod 39 by means of the spring 43. A plate 44 and cap screws 45 hold the spring in place. The sleeve 40 is fixed on the end of a tubular member 46 and this member is pivoted at 47 on the shackle 48 fixed to a portion or cross member 16 of the frame by the nut 49.

In operation when the vehicle motor is running and the pedal is depressed, the brake rod in this instance by means of the bracket 21 carries the valve rod 19 with the valve 18 forward, which motion closes the port 36, and connects the ports 26 and 29 and thus connects the conduits 27 and 30 and thereby connecting the intake manifold with the vacuum chamber which acts in the usual way to apply the brake by pulling forward the brake lever 10, the forward movement of the brake lever does not affect the foot pedal on account of the slot 8 in the clevis 7. When the pedal is released the spring 4 brings the pedal back to its original position, and the valve is moved to bring the port 37 over the ports 29 and 36 thus releasing the vacuum in the chamber allowing the brake lever to return and release the brake. The friction sleeve holds the valve body against the movement of the valve, but when further movement is required as in setting the brake by foot pedal, the valve body is carried forward against the friction on the rod 39.

It will be seen from the foregoing description that a very efficient air control means for auxiliary power brakes has been attained without interfering in any way with the pedal brake as now used.

Having thus described my invention what I desire to protect the Letters Patent of the United States is as follows but modifications may be had in carrying out the invention as shown in the accompanying drawing and particularly described form thereof within the purview of the annexed claims.

I claim:

1. An air control mechanism in combination with a motor vehicle having a motor including an intake manifold, and a pedal actuated brake mechanism comprising a slidable control valve body having ports and connections between the intake manifold of the motor of said vehicle and a vacuum actuated brake for said vehicle, a valve to control the ports in said valve body, a rod for operating said valve, a rod fixed to said valve body, a bearing support for said rod attached to the frame of said vehicle, and a frictional retarding means acting on said rod to hold said valve body until said valve moves to open or close said ports and means to attach said operating rod to said brake mechanism.

2. An air control mechanism of the class described comprising in combination, a motor vehicle having a motor including an intake manifold, and a foot pedal brake and operating mechanism, a vacuum chamber having a diaphragm connected to said brake mechanism, a valve body, ports in said body, a conduit connecting one of said ports to said vacuum chamber, a conduit connecting another of said ports with the intake manifold of said vehicle motor, a valve in said body having a port adapted to connect two of said ports, and one of said ports and the open air, a rod for operating said valve, means to attach said rod to said brake mechanism, a slidable support rod fixed on said valve body, a frictional retarding sleeve on said support rod, a tubular member attached to said sleeve, said tubular member being pivoted to the frame of said vehicle.

3. An air control mechanism of the class described comprising in combination, a motor vehicle having a foot pedal brake mechanism, a vacuum chamber having a flexible diaphragm and connections to said brake mechanism, a control unit consisting of a valve body, a valve in said body, an operating rod for said valve, a connecting bracket adapted to connect said operating rod to said brake mechanism, a support rod for said valve body, a tubular member into which said rod is adapted to slide, a friction retarding sleeve on said tubular member, a shackle fixed to said vehicle frame and pivoted to said tubular member, and lost motion connecting means between said brake pedal and said brake mechanism.

4. An air control mechanism comprising a control valve body, a valve in said body, a rod to operate said valve, a support rod on said valve body, a support for said rod, a frictional retarding means for said support rod, means to connect said valve body with a source of air pressure to an operative mechanism, and means to operate said valve rod to open or close said valve before moving said valve body.

5. An air control mechanism of the class described comprising in combination a vehicle having a motor, including an intake manifold, and a foot pedal operated brake mechanism including a brake rod, a vacuum chamber having a flexible diaphragm and operating connections to said brake mechanism, a control unit comprising a support rod, a valve body mounted on said rod, a slidable valve in said body, an operating rod for said valve, clamp means to connect said operating rod to said brake rod, a sleeve adapted to be connected to the frame of said vehicle and allow the support rod to slide therein, a frictional retarding means acting on said support rod in said sleeve, conduits connecting said valve body with said vacuum chamber and the intake manifold of said motor.

6. An air control mechanism of the class described comprising in combination a vehicle having a motor including an intake manifold, and a foot pedal operated brake mechanism including a brake rod, a vacuum power chamber having a flexible diaphragm, and operating connections to said brake mechanism, a control unit comprising a tubular member adapted to be pivoted to the frame of said vehicle adjacent, and approximately parallel with said brake rod, a support rod slidable in said tubular member, a valve body on said support rod, a valve in said body, an operating rod for said valve, a bracket on the end of said operating rod having means to clamp on to said brake rod, lost motion connection between said brake rod and said brake mechanism, and conduit connections between said valve body and said vacuum chamber and the intake manifold of said motor.

DUDLEY F. SEARLE.